Oct. 30, 1928.

J. K. ELDERKIN 1,689,819

REMOVABLE CHEMICAL RECTIFIER

Filed Nov. 10, 1925

WITNESS
Olive N. Holmes

INVENTOR
JAMES K. ELDERKIN
BY Knight B.
ATTORNEYS

Patented Oct. 30, 1928.

1,689,819

UNITED STATES PATENT OFFICE.

JAMES KNOX ELDERKIN, OF MONTCLAIR, NEW JERSEY, ASSIGNOR, BY MESNE ASSIGNMENTS, TO FOREST ELECTRIC CORPORATION, OF NEWARK, NEW JERSEY, A CORPORATION OF NEW JERSEY.

REMOVABLE CHEMICAL RECTIFIER.

Application filed November 10, 1925. Serial No. 68,181.

This invention relates to electrolytic rectifiers wherein two electrodes are immersed in a suitable electrolyte.

The object of the present invention, is to produce rectifying cells that may be used in connection with a suitable fixed socket in a manner similar to the use of electric lamps in sockets. The rectifying cells may then be easily removed for renewal and such cells may be carried in stock to be supplied as needed.

Figure 1:
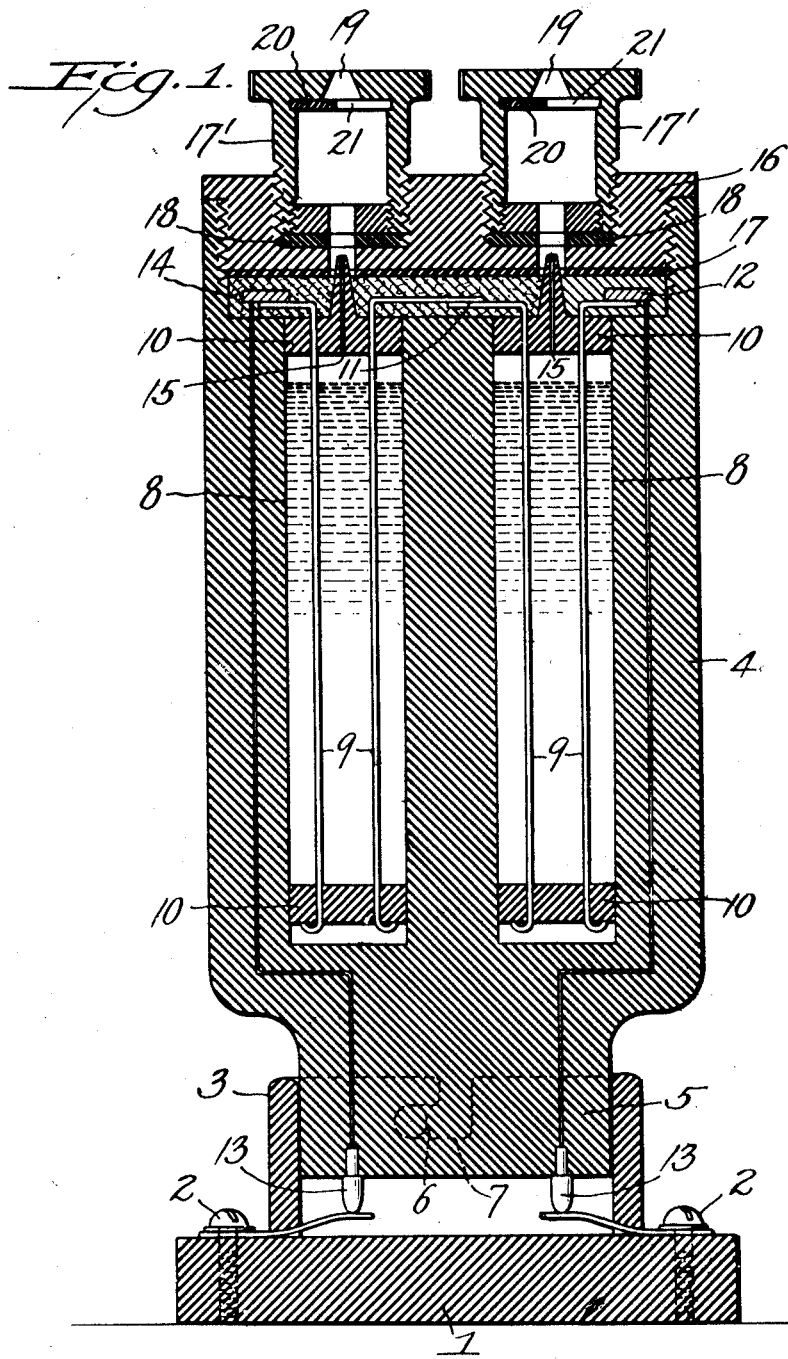
Figure 2:
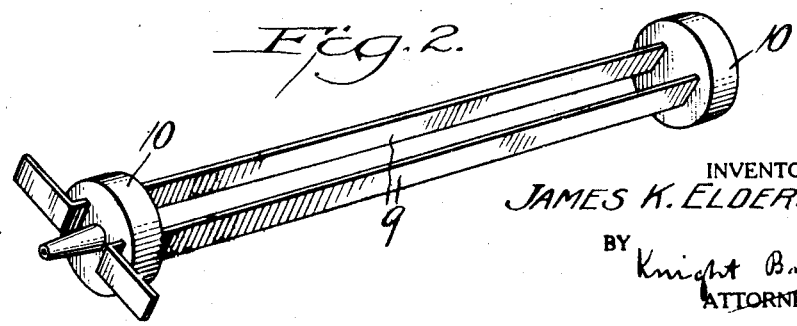

The invention may best be described in connection with the accompanying drawings, in which Figure 1 represents a longitudinal vertical section through a rectifier unit and Figure 2 represents a perspective view of an assembled pair of electrodes.

Referring to Figure 1, 1 represents the base of the socket for terminals 2 intended to be connected to the wires of an electric supply system. The socket has the usual centralizing part 3. The rectifier has a main body 4, of suitable insulating material, as for example, hard rubber synthetic resin or the like. The lower end of this main body 4, has a base position 5 adapted to fit in the socket 3 and being held therein by a pin 6, engaging with a bayonet slot 7 in the socket 3. Any other means of securing the rectifier in the socket may be used as for example the ordinary Edison socket. The main body portion 4 has a plurality of cells 8 extending downwardly from the top. In each of the cells may be inserted the electrodes 9, the same being supported at the upper and lower ends by being passed through disks 10 of insulating material. Electrodes may be in the form of flat strips and folded over at each end as shown. The folds at the upper end will contact with the folds of the adjacent cells as shown at 11. The terminal cells have their electrodes contacting with conductor 12 which lead to contacts 13 in the base of the main body 4, which contacts are adapted to connect with the terminals 2 of the socket. Covering the cells and sealing the same from leakage is a layer of pitch 14. Aperture 15 extends through the upper disk 10 and the pitch sealing to allow gas to escape. A cover of insulating material 16 is screwed or otherwise fastened in the upper part of the main body and a soft rubber washer 17, may be interposed between the said cover and the layer 14. The cover has an orifice immediately over the center of the cells through which the gas may escape after passing through the pitch cover 15. A counterbore pole around each of these orifices is plugged by a cap 17 which may be screwed into the counterbore and have rubber washer 18 sealing its lower edge. The tops of these caps have orifices 19 for the escape of the gas. Inside the tops of the caps a soft rubber washer 20 has a slit 21 in the center thereof, which being normally closed through the resilience of the rubber, still will allow the gas to seep out. Should the rectifier be laid down horizontally or even inverted, the electrolyte will have difficulty in passing thru the orifice 15 unless the cell is subject to a jolt. Should however, some drops of the electrolyte escape into the cap 17, they will not pass by the soft rubber stoppers 20. It will be seen that the cells are connected in series and it is possible to have several cells in one main body all connected in series so as to give higher potential rectification.

I claim:—

1. In a removable electrolytic rectifier the combination comprising a main body of insulating material having a plurality of cells therein, electrodes in the cells, the electrodes of one cell being connected in series with the electrodes of another cell, a top covering of insulating material over the cells and connections, terminals on the base of the main body and conductors leading from the said terminals to the electrodes.

2. In a removable electrolytic rectifier the combination of a main body of insulating material having cells adapted to hold electrolyte and electrodes, an insulating cover for said cells secured against leakage, with ventilating apertures permitting the free escape of gases but not of liquids and an additional covering over the said apertures having openings to the atmosphere with flexible stoppers, said stoppers having slits normally closed and opening only to pressure.

JAMES KNOX ELDERKIN.